United States Patent [19]

Takagi et al.

[11] Patent Number: 4,967,609
[45] Date of Patent: Nov. 6, 1990

[54] FLEXIBLE BOOT

[75] Inventors: Eitaro Takagi; Nobuyuki Ito, both of Chigasaki; Masato Umeda, Yokosuka, all of Japan

[73] Assignee: Keeper Co., Ltd., Tokyo, Japan

[21] Appl. No.: 359,326

[22] Filed: May 31, 1989

[30] Foreign Application Priority Data

May 31, 1988 [JP] Japan ............................ 63-72179[U]
May 31, 1988 [JP] Japan ............................ 63-72180[U]

[51] Int. Cl.⁵ ............................................. F16J 15/52
[52] U.S. Cl. .......................................... 74/18; 74/18.1; 277/212 FB; 277/231; 403/50; 403/51; 464/175
[58] Field of Search ................. 74/18, 18.1; 403/50, 403/51; 277/212 FB, 229, 231, 232, 233; 464/173, 175

[56] References Cited

U.S. PATENT DOCUMENTS

| | | | |
|---|---|---|---|
| 4,233,470 | 11/1980 | Wight, Jr. ............... | 174/120 C |
| 4,278,262 | 7/1981 | Mizutani et al. ........... | 277/212 FB |
| 4,369,979 | 1/1983 | Krude et al. .............. | 74/18 |
| 4,424,834 | 1/1984 | Sumi et al. ............... | 428/476.9 |
| 4,573,693 | 3/1986 | Nakata et al. ............ | 74/18.1 |
| 4,794,134 | 12/1988 | Wheeler et al. ........... | 524/186 |

FOREIGN PATENT DOCUMENTS 1178984 12/1984 Canada ..................... 277/212 FB
527344 6/1931 Fed. Rep. of Germany ....... 74/18.2

OTHER PUBLICATIONS

Chambers/Cambridge; "Chambers Science and Technology Dictionary", 1988, p. 641.
Sax & Lewis: "Hawley's Condensed Chemical Dictionary", 1987, p. 866.

Primary Examiner—Leslie A. Braun
Assistant Examiner—Scott Anchell
Attorney, Agent, or Firm—Wegner & Bretschneider

[57] ABSTRACT

A flexible boot having a bellows and mount portions on both axial ends of the bellows portion at which the boot is mounted on parts of a mechanism such as an automotive constant velocity joint. The flexible boot has an anti-degradation agent make-up element made of a material which contains an anti-degradation agent and which is capable of allowing the anti-degradation agent to precipitate on the surface thereof. The anti-degradation agent make-up element is fitted on at least a portion of the outer surface of the bellows so that the anti-degradation agent precipitated on the surface of the material of the anti-degradation agent make-up element is caused to progressively immigrate into the material of the bellows thereby making-up the anti-degradation agent in the bellows.

3 Claims, 1 Drawing Sheet

FLEXIBLE BOOT

BACKGROUND OF THE INVENTION

1. Field of the Invention

The present invention relates to a flexible boot which is made of a rubber. More particularly, the present invention is concerned with a boot which is used as a covering member for covering mechanical elements of, for example, a constant velocity joint or a steering mechanism of an automobile so as to keep dust, water and other matters away from the mechanical elements while preventing lubricant and other matters from being scattered to the outside.

2. Description of the Prior Art

In general, a flexible boot has an elastically deformable bellows which can be elongated, contracted or bent in accordance with the movement of a mechanical element. During long use in the atmosphere, minute cracks are generated in the surface of the bellows, particularly in the valleys, due to action of oxygen and ozone in the atmospheric air. Such cracks grow progressively to cause a rupture of the flexible boot at the valley of the bellows.

In order to prevent cracking in the bellows, a rubber material containing an anti-degradation agent capable of suppressing degradation effect of oxygen and ozone has been used as the material of flexible boots.

This countermeasure, however, suffers from the following problem. Namely, the anti-degradation agent contained in the rubber material tends to progressively immigrate into grease which is charged in the space inside the flexible boot, with the result that the anti-degradation agent contained in the rubber material of the flexible boot is gradually decreased to reduce resistance against oxygen and ozone, thus allowing cracking in the bellows of the boot.

SUMMARY OF THE INVENTION

Accordingly, an object of the present invention is to provide a flexible boot which is capable of overcoming the above-described problems of the prior art.

To this end, according to the present invention, there is provided a flexible boot having a bellows and mount portions on both axial ends of the bellows portion at which the boot is mounted on mechanical elements, the flexible boot comprising: an anti-degradation agent make-up element made of a material which contains an anti-degradation agent and which is capable of allowing the anti-degradation agent to precipitate on the surface thereof, the content of the anti-degradation agent in the anti-degradation agent make-up element being large enough to cause the precipitation of the anti-degradation agent on the surface of the material, the anti-degradation agent make-up element being fitted on at least a portion of the outer surface of the bellows so that the anti-degradation agent precipitated on the surface of the material of the anti-degradation agent make-up element is caused to progressively immigrate into the material of the bellows thereby making-up the anti-degradation agent in the bellows.

In general, when an anti-degradation agent exists in a rubber, oil or certain kinds of resin in excess of a predetermined amount, the anti-degradation agent tends to be progressively precipitated on the surface of the rubber material. A similar tendency is observed also with the cases of other rubbery elastic materials such as thermoplastic elastomers, e.g., santoprene, and gel-type rubbery elastic materials.

In the flexible boot of the present invention, an anti-degradation agent make-up element containing a sufficient amount of degradation agent is provided on the outer surface of the bellows. Since this element is rich in the anti-degradation agent, the agent precipitates on the surface of the make-up element and then is supplied into the rubber material of the bellows which contacts the make-up element. Therefore, the rubber material of the bellows of the flexible boot contains the anti-degradation agent in an amount large enough to prevent degradation, despite the progressive immigration of the agent into the grease contacting the bellows.

Other objects, features and advantages of the invention will become clear from the following description of the preferred embodiments when the same is read in conjunction with the accompanying drawings.

BRIEF DESCRIPTION THE DRAWINGS

FIG. 1 is a sectional view of a first embodiment of the flexible boot in accordance with the present invention, used on an automotive constant velocity joint; and FIG. 2 is a sectional view of a second embodiment of the flexible boot in accordance with the present invention.

DESCRIPTION OF THE PREFERRED EMBODIMENTS

Figure 1:
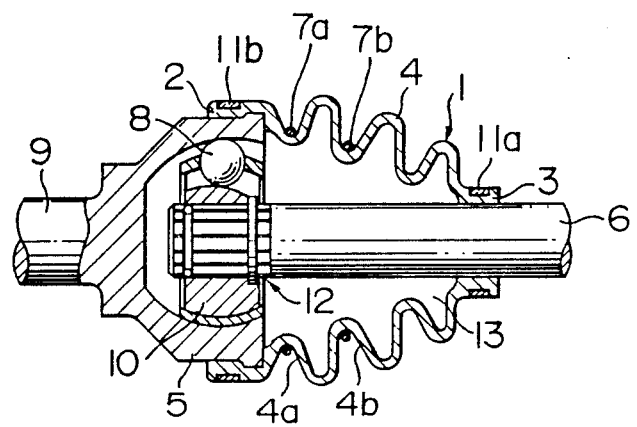

FIG. 1 illustrates a first embodiment of the flexible boot of the present invention, mounted on a constant velocity joint of an automobile. The constant velocity joint has a construction which is known per se. Namely, it has a joint unit 12 which is composed of an inner race 10 provided on one end of a first shaft 6, an outer race 5 provided on one end of the second shaft 9, and torque-transmitting balls 8 provided between the inner and outer races 10 and 5.

The flexible boot, generally denoted by 1, is made of a rubber and has a mount portion 3 which is mounted on and fixed to the first shaft 6 by a fixing member 11a, another mount portion 2 mounted on and fixed to the outer race 5 by a fixing member 11b, and a bellows 4 between the mount portions 3 and 2. The bellows 4 defines an internal space 13 which is charged with a grease. Various rubber materials such as CR, NBR, EPT and so forth can be used as the material of the flexible boot 1.

Rings 7a and 7b are fitted on the surface of valleys 4a and 4b of the bellows 4 adjacent to the joint unit 12, in close contact with the surface of these valleys. These rings 7a and 7b are made of a rubber or a rubbery elastic material which contains an antidegradation agent. The amount of the anti-degradation agent in the material of each ring 7a, 7b is determined to be large enough to cause the agent to precipitate on the ring surface in an amount which is large enough to enable the anti-degradation agent to be continuously immigrated into rubber material of the bellows 4 thereby making-up or compensating for immigration of the agent into the grease contacting the inner surface of the bellows. For instance, when CR is used as the rubber material of the rings, a satisfactory result is obtained if at least 5 weight parts of the anti-degradation agent is contained per 100 weight parts of the CR rubber material of the rings. The rings 7a, 7b may be made from a rubber such as NBR, EPT and so forth besides CR mentioned above, as well as from a rubbery elastic material such as a thermoplastic elastomer, e.g., santoprene, and gel-type rubbery material. Anyway, a material which permits an easy precipitation of the anti-degradation agent is preferably used as the material of the rings 7a, 7b. It is also preferred that the rubber or rubbery elastic material of the rings has a rigidity which is equivalent to or slightly lower than that of the rubber material of the flexible boot 1, in order to maintain a tight contact between the rings 7a, 7b and the valleys of the bellows 4. From this point of view, the material of the rings preferably has a rigidity as specified by 40-60JISA.

In the illustrated embodiment, the rings are fitted in only two valleys 4a, 4b adjacent to the joint body 12, because the cracking is most likely to occur in these valleys. This, however, is only illustrative and the arrangement may be such that only one of these valleys receives a ring or similar rings are fitted in other valleys of the bellows 4 in addition to or in place of the rings 7a, 7b. The circular cross-sectional shape of the rings 7a, 7b is not essential. Namely, the ring can have any suitable cross-sectional shape such as crescent form.

The present inventors have conducted a test on the flexible boot of the first embodiment, in order to confirm the effect brought about by the invention. The test employed a sample A which was the flexible boot of the first embodiment as shown in FIG. 1, as well as conventional flexible boot samples B and C. As the material of the flexible boot 1 and the rings 7a, 7b, CR rubber containing an anti-degradation agent having a rigidity level of 60 JISA was used. The quantity of the anti-degradation agent in the material of the rings 7a, 7b was 20 weight parts per 100 parts of the rubber. An agent consisting mainly of mixed diaryl-pphenylenediamine, produced and sold by Ohuchi Shinko Kagaku Kogyo Kabushiki Kaisha of Japan under registered trademark of NOCRACK 630 was used as the anti-degradation agent. The sample B had a construction basically the same as that of the sample A except that the rings 7a, 7b did not contain any anti-degradation agent at all. The sample C was different from the sample A only in that it is devoid of the rings 7a, 7b on the sample A.

These samples A, B and C were mounted on constant velocity joints of the type shown in FIG. 1. The constant velocity joints with each sample mounted thereon were continuously driven in an ozone tank and lengths of time until the samples are cracked and then ruptured were measured. The concentration of ozone of the atmosphere in the ozone tank was 50 pphm and the temperature of the atmosphere was 40° C. The running speed of the constant velocity joints was 600 rpm and the joint angle, i.e., the angle formed between the axes of the shafts 6 and 9, was 25°. The results of the test are shown in Table 1.

TABLE 1

| Samples/Items | Cracking Time (Hr) | Rupture Time (Hr) |
| --- | --- | --- |
| A | 800 | 1800 |
| B | 350 | 800 |
| C | 200 | 600 |

Table 1 shows that the sample B, which incorporates rings containing no anti-degradation agent, exhibits greater strength, i.e., smaller tendency for cracking and rupture, than the sample C which does not incorporate any ring. This is considered to be attributable to the fact that the rings provides a sealing effect to keep ozone away from the valleys of the bellows. It will be seen also that the sample A constructed in accordance with the first embodiment, i.e., the flexible boot having rings containing the anti-degradation agent, exhibits resistance to crack and rupture which is still higher than that of the sample B, thus proving a longer life of the flexible boot of the invention than known flexible boots.

Figure 2:
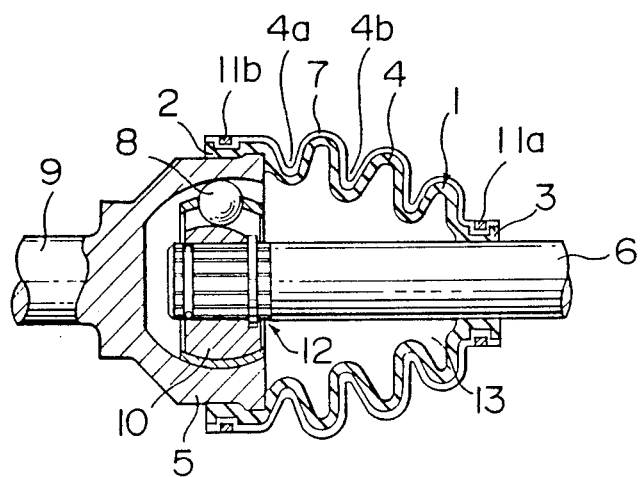

FIG. 2 shows a second embodiment of the flexible boot of the present invention mounted on an automotive constant velocity joint. Description of this constant velocity joint is omitted because the construction of this joint is materially the same as that shown in FIG. 1. In FIG. 2, the same or the like numerals are used to denote the same or the like parts as those appearing in FIG. 1.

As is the case of the first embodiment, the second embodiment of the flexible boot, generally denoted by 1a, is made of a rubber, and has a mount portion 3 which is mounted on and fixed to the first shaft 6 by a fixing member 11a, another mount portion 2 mounted on and fixed to the outer race 5 by a fixing member 11b, and a bellows 4 between the mount portions 3 and 2. The bellows 4 defines an internal space 13 which is charged with a grease. Various rubber materials such as CR, NBR, EPT and so forth can be used as the material of the flexible boot 1.

A thin-walled elastic coat 7 fits around the entire outer peripheral surface of the flexible boot 1. The elastic coat 7 is made of a rubber which contains an anti-degradation agent. The amount of the anti-degradation agent in the elastic coat 7 is determined to be large enough to cause the agent to precipitate on the surface of the elastic coat 7 in an amount which is large enough to enable the anti-degradation agent to be continuously immigrated into the rubber material of the bellows 4 thereby making-up or compensating for immigration of the agent into the grease contacting the inner surface of the bellows. For instance, when CR is used as the rubber material of the elastic coat 7, a satisfactory result is obtained if at least 5 weight parts of the anti-degradation agent is contained per 100 weight parts of the CR rubber material. The rubber material of the elastic coat 7 has a wide selection such as NBR, EPT and so forth besides CR mentioned above. Anyway, a material which permits an easy precipitation of the anti-degradation agent is preferably used as the material of the elastic coat 7. It is also preferred that the rubber or rubbery elastic material of the elastic coat 7 has a rigidity which is equivalent to or slightly lower than that of the rubber material of the flexible boot 1, in order to maintain a tight fit of the elastic coat 7 on the bellows 4, as well as good follow-ability of the elastic coat 7 to expansion, contraction and deflection of the bellows 4. From this point of view, the material of the elastic coat preferably has a rigidity as specified by 40-60JISA.

Although in the described second embodiment the elastic coat 7 covers the entire part of the outer peripheral surface of the boot 1a, this is only illustrative and the elastic coat 7 may be provided to fit only on one or more valleys of the bellows 4 where cracking is most likely to occur. The valleys to which the elastic coat 7 fits preferably include, at least, two valleys 4a, 4b adjacent to the joint unit 12, since these two valleys are most liable to be cracked among all the valleys of the bellows 4 of the flexible boot 1.

The elastic coat can be formed by preparing a rubber paste by dissolving, together with an anti-degradation agent, a rubber in a solvent, and applying the rubber paste to the outer peripheral surface of the flexible boot 1a by means of a brush or by spraying or dipping. Any type of solvent capable of dissolving the rubber may be used but the use of a solvent which may adversely affect the rubber of the flexible boot 1 should be avoided.

Although an elastic coat 7 made of a rubber has been specifically mentioned, the elastic coat fitting on the outer peripheral surface of the flexible boot 1 may be formed from a material prepared by mixing an anti-degradation agent in a resin. The resin used as the material of the elastic coat 7 should be such one that allows an easy precipitation of the anti-degradation agent on the surface thereof. An example of resin suitably used is a thermoplastic elastomer such as santoprene. When a resin is used as the material of the elastic coat 7, the quantity of the anti-degradation agent is preferably 3 weight parts or greater per 100 weight parts of the resin.

The anti-degradation agent make-up element of the invention also may be formed by dissolving an anti-degradation agent in an oil, applying the oil to the outer peripheral surface of the flexible boot 1 by a brush or by spraying or dipping, and then drying the oil to form a coat. The oil used as the coat material preferably permits an easy precipitation of the anti-degradation agent on the surface thereof in dried state. It is also preferred that the oil can be dried and solidified in a short time when left in the air. Examples of oil suitably used as the coat material are dry-type oils such as linseed oil, perilla oil and tung oil. The content of the anti-degradation agent in the oil is preferably not smaller than 5 wt %.

The inventors conducted a test as follows. The test employed sample D, E which were flexible boots of the invention, as well as conventional flexible boot samples F, G and H. The sample D had a construction materially the same as that shown in FIG. 2. As the material of the flexible boot 1 and the elastic coat 7, CR rubber containing an anti-degradation agent having a rigidity level of 60 JISA was used. The quantity of the anti-degradation agent in the material of the elastic coat 7 was 20 weight parts per 100 parts of the rubber. The rubber material with the anti-degradation agent contained therein was dissolved in a solvent to form a rubber paste which was then uniformly applied to the entire outer peripheral surface of the flexible boot 1, followed by a 30-minute firing (vulcanization) at 150° C. An agent consisting mainly of mixed diaryl-p-phenylenediamine, produced and sold by Ohuchi Shinko Kagaku Kogyo Kabushiki Kaisha of Japan under registered trademark of NOCRACK 630 was used as the anti-degradation agent. The sample E had a coat which was formed by dissolving 20 wt % of the anti-degradation agent in an oil and applying the oil to the outer peripheral surface of the flexible boot. Other portions of the sample E were materially the same as those of the sample D. The oil used in the sample E was a linseed oil, and the anti-degradation agent used in the example E was the same as that used in the sample D. The sample F was a flexible boot which was different from the sample D only in that the elastic coat 7 did not contain any anti-degradation agent. The sample G was materially the same as the sample E except that the oil applied to the surface of the flexible boot did not contain any anti-degradation agent. The sample H was a flexible boot which incorporated neither the elastic coat 7 of the type shown in FIG. 2 nor the coat of the dried oil, i.e., a named flexible boot.

These samples D,E,F,G and H were mounted on constant velocity joints of the type shown in FIG. 2. The constant velocity joints with each sample mounted thereon were continuously driven in an ozone tank and lengths of time until the samples are cracked and then ruptured were measured. The concentration of ozone of the atmosphere in the ozone tank was 50 pphm and the temperature of the atmosphere was 40° C. The running speed of the constant velocity joints was 600 rpm and the joint angle, i.e., the angle formed between the axes of the shafts 6 and 9, was 25°. The results of the test are shown in Table 2.

TABLE 2

| Samples/Items | Cracking Time (Hr) | Rupture Time (Hr) |
|---|---|---|
| D | 1000 | 2000 |
| E | 700 | 1300 |
| F | 500 | 1100 |
| G | 300 | 700 |
| H | 200 | 600 |

Table 2 shows that the samples B, F and G, which incorporate the elastic coat and oil coat containing no anti-degradation agent, exhibit greater strength, i.e., smaller tendency for cracking and rupture, than the sample H which is devoid of such an elastic coat and the oil coat. This is considered to be attributable to the fact that the rings provide a sealing effect to keep ozone away from the valleys of the bellows. A comparison between the sample F and the sample G shows that the sample F provided a higher sealing effect than the sample G. It will be seen also that the samples D and E respectively having the elastic coat 7 and the oil coat both including the anti-degradation agent exhibit resistance to crack and rupture still higher than that of the samples F and G, this proving a longer life of the flexible boot of the invention than known flexible boots.

As will be understood from the foregoing description, the flexible boot according to the present invention effectively suppresses tendency for cracking and rupture of the boot caused by action of oxygen and ozone, thus offering extended life of flexible boots of the type described.

What is claimed is:

1. A flexible boot having a bellows and mount portions on both axial ends of said bellows at which said boot is mounted on mechanical elements, said flexible boot comprising:

an anti-degradation agent make-up element including at least one ring fitting in at least one valley of said bellows, said at least one ring being made of a rubber or rubbery material which contains an anti-degradation agent and which is capable of allowing said anti-degradation agent to precipitate on the surface thereof, the content of said anti-degradation agent in said anti-degradation agent make-up element being large enough to cause the precipitation of said anti-degradation agent on the surface of said material, said anti-degradation agent make-up element being fitted on at least a portion of the outer surface of said bellows so that said anti-degradation agent precipitated on the surface of the material of said anti-degradation agent make-up element is caused to progressively immigrate into the material of said bellow thereby making-up said anti-degradation agent in said bellows.

2. A flexible boot as recited in claim 1, wherein said at least one ring has a rigidity of 40–60 JISA.

3. A flexible boot as recited in claim 1, wherein said at least one ring includes a ring fitted in each of the two valleys at the axial end of the bellows for mounting adjacent a constant velocity joint.

* * * * *